US012719968B2

(12) United States Patent
Lusted

(10) Patent No.: US 12,719,968 B2
(45) Date of Patent: Aug. 25, 2026

(54) ETHERNET AUTO-NEGOTIATION TECHNOLOGY ABILITY AND FORWARD ERROR CORRECTION (FEC) FUNCTIONS

(71) Applicant: Intel Corporation, Santa Clara, CA (US)

(72) Inventor: Kent C. Lusted, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 379 days.

(21) Appl. No.: 18/287,858

(22) PCT Filed: Sep. 12, 2022

(86) PCT No.: PCT/US2022/043253
§ 371 (c)(1),
(2) Date: Oct. 20, 2023

(87) PCT Pub. No.: WO2023/136865
PCT Pub. Date: Jul. 20, 2023

(65) Prior Publication Data

US 2024/0205311 A1 Jun. 20, 2024

Related U.S. Application Data

(60) Provisional application No. 63/330,174, filed on Apr. 12, 2022, provisional application No. 63/299,318, filed on Jan. 13, 2022.

(51) Int. Cl.
*H04L 69/24* (2022.01)
*H04L 1/00* (2006.01)

(52) U.S. Cl.
CPC ............ *H04L 69/24* (2013.01); *H04L 1/0041* (2013.01)

(58) Field of Classification Search
CPC .............................. H04L 69/24; H04L 1/0041
See application file for complete search history.

(56) References Cited

U.S. PATENT DOCUMENTS

| | | | |
|---|---|---|---|
| 9,219,676 B2 | 12/2015 | Diab et al. |
| 2009/0129777 A1 | 5/2009 | Singh |
| 2014/0258813 A1 | 9/2014 | Lusted et al. |
| 2021/0072811 A1 | 3/2021 | Wertheimer et al. |

OTHER PUBLICATIONS

International Search Report and Written Opinion for PCT Patent Application No. PCT/US22/43253, Mailed Jan. 2, 2023, 8 pages.
Kent Lusted et al., 'Nomenclature: The Joy of PMD names', IEEE P802.3df Task Force, Jan. 6, 2022 [retrieved on Dec. 6, 2022]. Retrieved from.
Extended European Search Report for Patent Application No. 22920930.9, Mailed Nov. 25, 2025, 12 pages.
LAN/MAN Standards Committee: "IEEE P802.3/D3.0, Dec. 2021—IEEE Draft Standard for Ethernet—passage—pp. 3101-3136, 4057-4094", Draft Standard for Ethernet,Dec. 2, 2021, 80 pages.

*Primary Examiner* — Blake J Rubin
(74) *Attorney, Agent, or Firm* — Compass IP Law PC

(57) ABSTRACT

Examples described herein relate to Ethernet physical layer transceiver (PHY) circuitry for use in frame communication with a remote link partner and that is to perform capabilities auto-negotiation with a link partner.

24 Claims, 8 Drawing Sheets

200GMII = 200 Gb/s MEDIA INDEPENDENT INTERFACE
25GMII = 25 GIGABIT MEDIA INDEPENDENT INTERFACE
400GMII = 400 Gb/s MEDIA INDEPENDENT INTERFACE
50GMII = 50 Gb/s MEDIA INDEPENDENT INTERFACE
AN = AUTO-NEGOTIATION
CGMII = 100 Gb/s MEDIA INDEPENDENT INTERFACE
GMII = GIGABIT MEDIA INDEPENDENT INTERFACE
MDI = MEDIUM DEPENDENT INTERFACE
800GMII = 800 Gb/s MEDIA INDEPENDENT INTERFACE
MDI = MEDIUM DEPENDENT INTERFACE
PCS = PHYSICAL CODING SUBLAYER
PHY = PHYSICAL LAYER DEVICE
PMA = PHYSICAL MEDIUM ATTACHMENT
PMD = PHYSICAL MEDIUM DEPENDENT
XGMII = 10 GIGABIT MEDIA INDEPENDENT INTERFACE
XLGMII = 40 Gb/s MEDIA INDEPENDENT INTERFACE

Figure 73-1--Location of Auto-Negotiation function within the ISO/IEC OSI reference model

FIG. 1

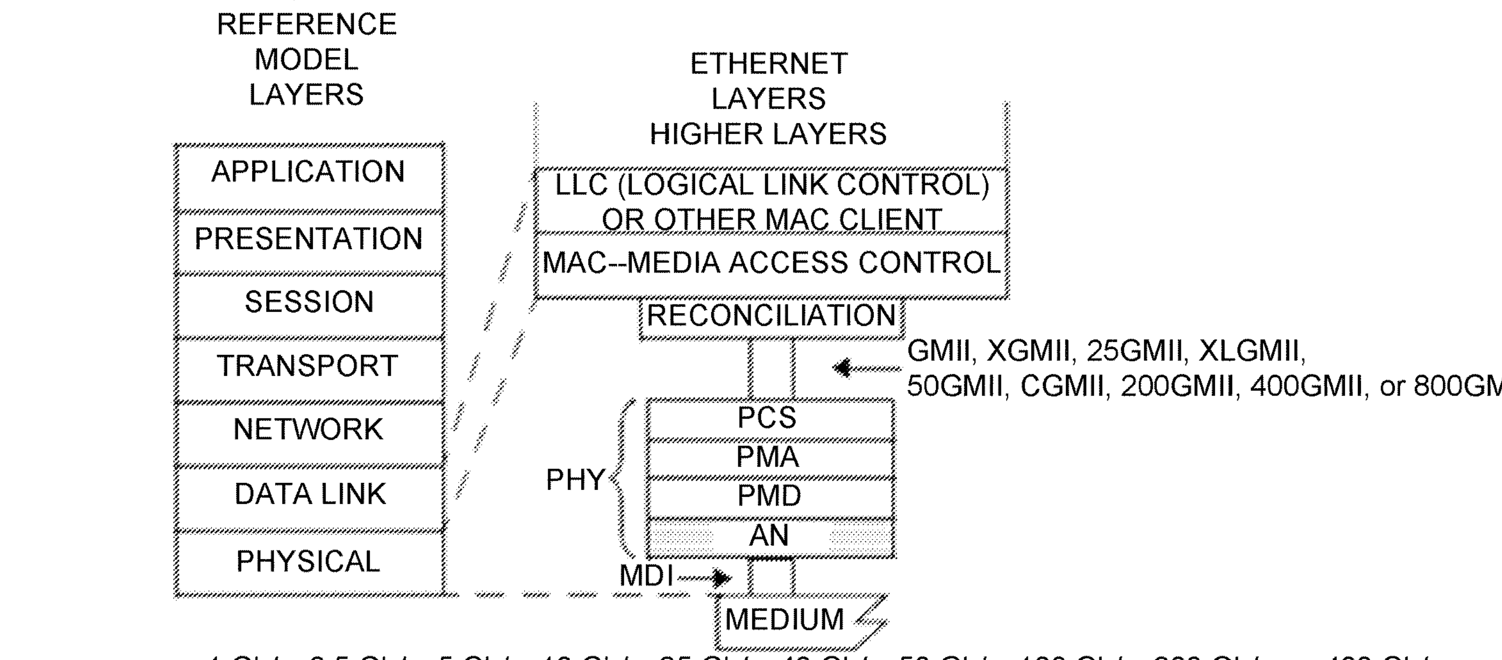

200GMII = 200 Gb/s MEDIA INDEPENDENT INTERFACE
25GMII = 25 GIGABIT MEDIA INDEPENDENT INTERFACE
400GMII = 400 Gb/s MEDIA INDEPENDENT INTERFACE
50GMII = 50 Gb/s MEDIA INDEPENDENT INTERFACE
AN = AUTO-NEGOTIATION
CGMII = 100 Gb/s MEDIA INDEPENDENT INTERFACE
GMII = GIGABIT MEDIA INDEPENDENT INTERFACE
MDI = MEDIUM DEPENDENT INTERFACE
800GMII = 800 Gb/s MEDIA INDEPENDENT INTERFACE

MDI = MEDIUM DEPENDENT INTERFACE
PCS = PHYSICAL CODING SUBLAYER
PHY = PHYSICAL LAYER DEVICE
PMA = PHYSICAL MEDIUM ATTACHMENT
PMD = PHYSICAL MEDIUM DEPENDENT
XGMII = 10 GIGABIT MEDIA INDEPENDENT INTERFACE
XLGMII = 40 Gb/s MEDIA INDEPENDENT INTERFACE

Figure 73-1--Location of Auto-Negotiation function within the ISO/IEC OSI reference model

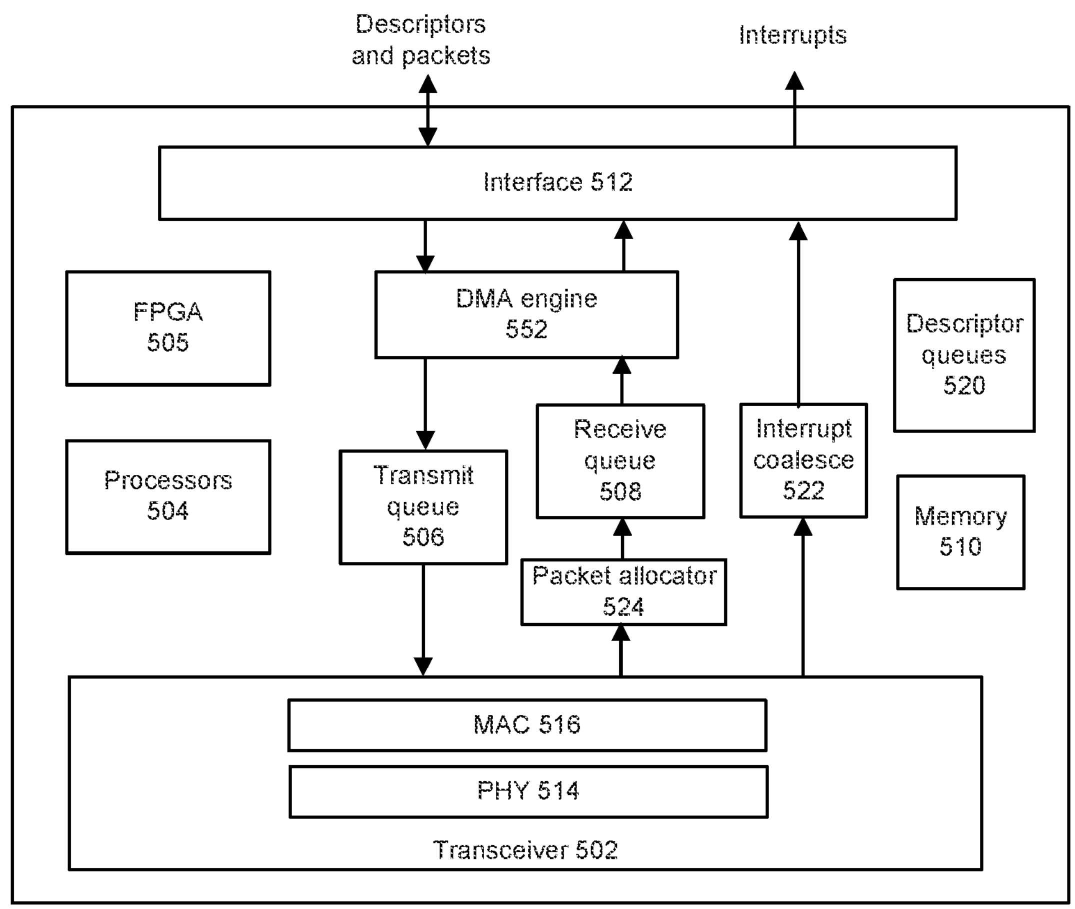
FIG. 5

ETHERNET AUTO-NEGOTIATION TECHNOLOGY ABILITY AND FORWARD ERROR CORRECTION (FEC) FUNCTIONS

CLAIM OF PRIORITY

This application is a U.S. National Phase application under 35 U.S.C. § 371 of International Application No. PCT/US22/43253, filed Sep. 12, 2022, which claims priority to U.S. Provisional Application No. 63/330,174, filed Apr. 12, 2022 and U.S. Provisional Application No. 63/299,318, filed Jan. 13, 2022. The entire contents of those applications are incorporated by reference in their entirety.

RELATED APPLICATION

This application claims priority to U.S. Provisional Application No. 63/330,174, filed Apr. 12, 2022 and U.S. Provisional Application No. 63/299,318, filed Jan. 13, 2022. The entire contents of those applications are incorporated by reference in their entirety.

DESCRIPTION

For network-connected devices to communicate packets or frames with each other, common communications capabilities and parameters are discovered. Auto-negotiation (AN) is a process whereby end points of a link share information on various capabilities relevant to their communication. For an example of AN, see Clause 73 of Institute of Electrical and Electronics Engineers (IEEE) 802.3-2022. Link partner devices exchange capabilities and modes of operation via the exchange of base pages and, if requested, the link partner devices exchange next pages to indicate capabilities. According to Clause 73 of IEEE 802.3-2022, a device sends a list of its data-rate and forward error correction (FEC) capabilities to its link partner device. AN can perform capability priority resolution to determine the highest common capability. The highest common capabilities can be used for communication between the link partner devices. After both devices receive their link partner's capability list, the devices can transition to the highest common data rate and feature capabilities.

Link training is a process used by a device connected through a copper cable, backplane, or other wired or wireless signal transmission media by which the transmitter and receiver communicate with each other in order to tune their equalization settings. For example, training data communications sent between a transmitter and a receiver can be used to tune equalization settings to mitigate frequency dependent signal attenuation. Equalization tuning can be applied at the transmitter (Tx) and/or at the receiver (Rx). For example, devices can tune equalizer settings of at least one serializer/ deserializer (SerDes) using link training. As link partners both include a transmitter and receiver, a link partner can simultaneously train the other partner's transmitter.

Link training can provide for tuning of a finite impulse response (FIR) filter for a channel in an application-specific integrated circuit (ASIC) or other device to achieve the desired bit error rate (BER), eye size, signal-to-noise ratio (SNR), or link error rate (e.g., uncorrectable and correctable forward error correction (FEC) errors, pseudorandom bit sequence (PRBS) errors, physical coding sublayer (PCS) errors, and so forth). In some examples, the receiver examines the eye after applying equalization to the signal and determines if eye height and/or eye width is acceptable. The receiver can determine to terminate link training because the eye is acceptable, or continue training to adjust the eye parameters further. If the receiver requests that its link partner transmitter change the precursor, main cursor or post-cursor equalization setting, the eye examination process may begin again. After the link is trained, the two devices begin sending normal data traffic using the optimized transmitter settings.

Table 1 depicts a base page format consistent with Clause 73 for Auto-Negotiation for Backplanes and copper cable assemblies.

AN73 Message Base Page, see FIG. 73-6

TABLE 1

| D0 | D1 | D2 | D3 | D4 | D5 | D6 | D7 | D8 | D9 | D10 | D11 | D12 | D13 | D14 | D15 |
|---|---|---|---|---|---|---|---|---|---|---|---|---|---|---|---|
| S0 | S1 | S2 | S3 | S4 | E0 | E1 | E2 | E3 | E4 | E5 | C0 | C1 | RF | ACK | NP |
| D16 | D17 | D18 | D19 | D20 | D21 | D22 | D23 | D24 | D25 | D26 | D27 | D28 | D29 | D30 | D31 |
| T0 | T1 | T2 | T3 | T4 | A0 | A1 | A2 | A3 | A4 | A5 | A6 | A7 | A8 | A9 | A10 |
| D32 | D33 | D34 | D35 | D36 | D37 | D38 | D39 | D40 | D41 | D42 | D43 | D44 | D45 | D46 | D47 |
| A11 | A12 | A13 | A14 | A15 | A16 | A17 | A18 | A19 | A20 | A21 | F4 | F2 | F3 | F0 | F1 |

The IEEE P802.3ck/D3.3 specification (Jun. 10, 2022) amends the base IEEE Std. 802.3-2022 specification so that 3 free bits remain in the base page, namely, bits D40:D42 (A19:A21). D15 indicates a NP (next page) bit, and when set, indicates there will be next page exchange. A first next page can include formatted next pages with defined meanings and user defined meanings. Subsequent next pages, if sent, can include unformatted next pages with defined meaning and user defined meetings.

BRIEF DESCRIPTION OF THE DRAWINGS

FIG. 1 depicts an example of use of an 800GMII (800 Gb/s media independent interface).

FIG. 5 depicts an example network interface.

DETAILED DESCRIPTION

Figure 2A:
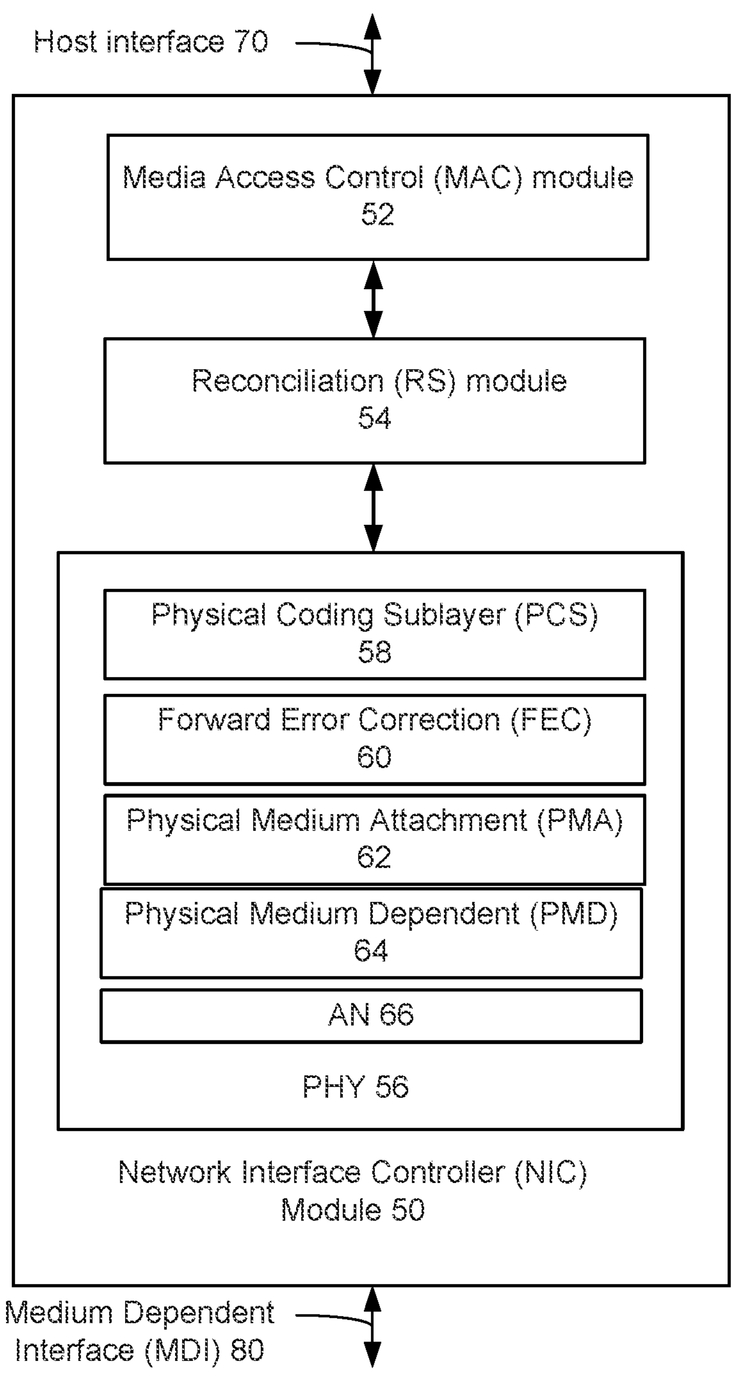
FIG. 2A is a block diagram illustrating Ethernet port circuitry in a network interface controller.

IEEE 802.3-2022 Auto-Negotiation link codeword base page for Backplane and Copper Cable Assembly, as defined in Clause 73, to convey link codeword page information. However, a link codeword base page may not have enough free bits to identify available capabilities and FEC modes. For example, the following can be added by IEEE P802.3df Task Force: PHY types 800G-R8, 1600G-R8, 200G-R1, 400G-R2, 800G-R4, and 1600G-R16 as well as additional FEC modes.

In some examples, at least to advertise a capability and/or an FEC mode of a PHY of a network interface device, one or more bits in a link codeword base page can be assigned specific values indicating extended fields residing in a next page associated with a new message code. For example, a Clause 73 AN field can be expanded to include more ability bits without changing the base page format nor the resolution protocol. For example, one or more bits (e.g., 3 bits) in a base page can be assigned specific values indicating the extended Technology Ability Field (TAF) and Forward Error Correction (FEC) fields are to be provided in a next page associated with a message code 2. For example, in a base page, A19-A21 (3 bits) set to 110b (e.g., A19=1, A20=1, A21=0) can indicate additional TAF_FEC bits are defined and assigned in a next page with message code 02 (e.g., "Technology Ability extension code 2" (per Annex 73A)). TAF_FEC can define at least one FEC operating mode capability of the Ethernet PHY circuitry. For example, a next page with message code 2 can be defined in Annex 73A to include additional technology ability fields (TAF) and FEC fields. For example, FEC can fields can indicate no-FEC mode, lower-latency FEC mode, or a higher-correction capability FEC to support a longer cable or backplane reach.

In some examples, at least to advertise a capability and/or an FEC mode of a PHY of a network interface device, an AN process can include operations 1 and 2. In operation 1, a Clause 73 AN link codeword base page can indicate at least support of eight-lane 800 GbE PHY type in a bit (e.g., A19) as well as other PHY capabilities. For example, after negotiation, 800G-R8 capability can be identified as 800G-R8 link status information. In operation 2, advertisement of remaining PHY type capabilities (A20-A21) can occur as well as advertisement of FEC capabilities and other capabilities. Advertised capabilities can be stored as negotiation-related information. After advertisement of capabilities, the transmitter and receiver can apply a highest common capability or highest available operating mode, unless configured otherwise, where the highest common capability is based on one or more of extended technology ability or FEC capability.

For example, in a Base Page, 3 bits (A19-A21) are available to advertise capability to support and perform at least 5 more PHYs (e.g., 800G-R8, 1600G-R8, 200G-R1, 400G-R2, 800G-R4, or others). In some examples, bit A19 indicates availability to utilize a 800G and bits A20-21 can be used for an extension. For example, 800G can represent 800GBASE-CR8 (for copper interface) or 800GBASE-KR8 (backplane interface). In some examples, concerning bit A19, an approach in 802.3by/cd/ck can be applied to not distinguish between the Backplane and Copper Cable PHYs during AN. A serializer/de-serializer (SerDes) of a transmitter and/or receiver can support both Direct Attach Copper (DAC) and Backplane (BP) to select 800GBASE-CR8 (copper) or 800GBASE-KR8 (backplane) (not both). Connection of DAC or BP to a port can cause SerDes setup before starting AN to configure operation of Physical Medium Dependent (PMD). In some examples, FEC can be non-negotiable for PHYs that support both DAC and BP. Bits A20-A21 can define an extensible solution for other PHY types or FEC modes. For example, bits A20-A21 could be given different values to indicate additional next page message codes with additional or different PHY types or FEC modes.

Referring to Table 1, in a link codeword base page, some examples define bits D40 to D42 (which convey bits A19: A21) of the Link codeword Base Page to be as follows. Bits D40 and D41 (which convey bits A20 and A21) can indicate Extended_TAF_1 capability. For example, values 00b and 01b can be reserved and a value of 01b (e.g., A20=0 and A21=1) can indicate additional technology ability field bits are defined in a next page having message code 2 (but may not include an FEC extension) whereas a value of 11b (e.g., A20=1 and A21=1) can be reserved.

Bit D42 can indicate Extended_FEC_1 capability F5. D42 value of 1 can indicate a device has extended FEC capability bits defined in next page having message code 2 (but may not include technology ability). A D42 value of 0 can indicate that a device does not have extended FEC capabilities. The Technology Ability and FEC extensions can include a Message Next Page (e.g., single formatted Next Page) that conveys extended TAF and extended FEC and no unformatted Next Page follows.

Examples of values, number of bits, and value or bit placement are exemplary and other values, number of bits, and value or bit placement can be used.

Example formats and contents of next pages are described at least in clause 73.7 of IEEE 802.3-2022. Table 2 depicts an example message next page of type code 2.

AN73 Message Next Page, see FIG. 73-7

TABLE 2

| D0 | D1 | D2 | D3 | D4 | D5 | D6 | D7 | D8 | D9 | D10 | D11 | D12 | D13 | D14 | D15 |
|---|---|---|---|---|---|---|---|---|---|---|---|---|---|---|---|
| Message Code Field (11 bits) | | | | | | | | | | | T | ACK2 | MP | ACK | NP |
| D16 | D17 | D18 | D19 | D20 | D21 | D22 | D23 | D24 | D25 | D26 | D27 | D28 | D29 | D30 | D31 |
| Extended_TAF_1[0:15] | | | | | | | | | | | | | | | |
| D32 | D33 | D34 | D35 | D36 | D37 | D38 | D39 | D40 | D41 | D42 | D43 | D44 | D45 | D46 | D47 |
| Extended_TAF_1[16:27] | | | | | | | | | | | | Extended_FEC_1[3:0] | | | |

In some examples, bits DO-D10 can convey a message code field in accordance with IEEE Standard 802.3-2022, Clause 73. In some examples, the message code field value can be 2 (e.g., M10:M0=00 0000 0010b) and match the value set by bits A19: A20 in the base page. If the message code field value is 2, then Extended_TAF_1 can be indicated in D16-D43 and Extended_FEC_1 can be indicated in D44-D47.

An example of contents of the unformatted code field U0:U31, corresponding to [D16:D47], can be defined as follows. The Extended_TAF_1[27:0] field can be represented by 28 bits, spanning [D16:D43]. For example, the capabilities can be advertised as shown in Table 3.

TABLE 3

| Bit Number | Dx bit | Capability Supported |
|---|---|---|
| Bit 0 | D16 | 800G-R8 |
| Bit 1 | D17 | 200G-R1 |
| Bit 2 | D18 | 400G-R2 |
| Bit 3 | D19 | 800G-R4, 1600G-R8 |
| Bit 4 | D20 | 1600G-R16 |
| Bits [5:27] | D21:D43 | reserved for use |

Referring again to Table 2, if a device has capabilities specified in the Extended_TAF_1 field, then the device's Priority Resolution order per Clause 73.7.6 and Table 73-5 can be updated to reflect the additional capabilities. The Extended_FEC_1[3:0] field can be 4 bits and can span [D44:D47] and can be reserved for use. If a device has capabilities specified in the Extended FEC_1 field, then the device's FEC Capabilities per Clause 73.6.5 can be updated to reflect the additional capabilities.

Bits [D11:D15] can retain their definitions in IEEE Standard. 802.3-2022, Clause 73.7.7.1.

Various modifications to IEEE Standard 802.3-2022 as modified by 802.3ck/D3.3 (Jun. 10, 2022), can be as follows. FIG. 1 depicts an example of potential use of an 800GMII (800 Gb/s media independent interface). To support eight-lane 800 GbE, an 800GMII can be an optional GMII.

Table 4 shows a modification of Table 73-4 of section 73.6.4 to add Technology Ability Field encoding. Bit A19 can represent use of 800GBASE-KR8 or 800GBASE-CR8. Bits A20 through A21 can be reserved state or unspecified by the standard. Use of A19 can provide for potentially faster resolution of capabilities and training.

TABLE 4

| Bit | Technology |
|---|---|
| A15 | 200GBASE-KR4 or 200GBASE-CR4 |
| A16 | 100GBASE-KR1 or 100GBASE-CR1 |
| A17 | 200GBASE-KR2 or 200GBASE-CR2 |
| A18 | 400GBASE-KR4 or 400GBASE-CR4 |
| A19 | 800GBASE-KR8 or 800GBASE-CR8 |
| A20 through A21 | Reserved |

Table 73-5 Priority Resolution can be updated to insert "800GBASE-KR8 or 800GBASE-CR8" as priority 1 and renumerate the table accordingly so that 200GBASE-KR4 or 200GBASE-CR4 is priority 2, 100GBASE-KR2 or 100GBASE-CR2 is priority 3, and so forth.

In section 73.10.1, an new entry into the State diagram variables can include: "800GR8; represents the 800GBASE-KR8 or 800GBASE-CR8 PMD."

In section 73.10.1, the single_link_ready can be revised to add "link_status_[800GR8]=OK"

In Table 73-7 Timer min/max value summary, the link_fail_inhibit_timer case can be updated to include the following entry:

| Parameter | Min | Value and tolerance | Max | Units |
|---|---|---|---|---|
| link_fail_inhibit_timer (when the link is 100GBASE-KR1, 100GBASE-CR1, 200GBASE-KR2, 200GBASE-CR2, 400GBASE-KR4, 400GBASE-CR4, 800GBASE-KR8, or 800GBASE-CR8) | 12.3 | | 12.4 | s |

After AN exchange of base pages and next pages with a link partner is complete, the link_fail_inhibit timer indicates a minimum and maximum times that a device can spend to select and enable at least PHY and FEC capabilities of a PMD. The capabilities of the PHY circuitry and the remote link partner are to be set before the defined minimum time of link_fail_inhibit and before the defined maximum time of link_fail_inhibit. The PMD can be resolved using highest common denominator rules according to Clause 73.

In FIG. 73-11, AN GOOD CHECK can be entered by one of the devices entering this state before a link partner device. The link_control_[HCD] can include link training and PCS block lock to select a highest capability supported by both devices, and as permitted by an OS and driver. The link_fail_inhibit_timer can be started at different times by link partner devices. A minimum (Min) link_fail_inhibit_timer can indicate a minimum expiration timer value whereas a maximum (Max) link_fail_inhibit_timer can indicate a maximum expiration timer value. Devices supporting 800GBASE-CR8 or 800GBASE-KR8 are to perform AN GOOD CHECK for at least 12.3 seconds and at most 12.4 seconds.

Table 45-388 Backplane Ethernet, BASE-R copper status 2 register (Register 7.49) bit definitions can be modified to include an entry for "800GBASE-KR8 or 800GBASE-CR8." For example, the entry can be in one or more of Reserved bits 7.49.15 to 7.49.3. In an example, Table 45-388 can be updated to include the following entry:

| Bits | Name | Description | RO[a] |
|---|---|---|---|
| 7.49.3 | 800GBASE-KR8 or 800GBASE-CR8 | 1 = PMA/PMD is negotiated to perform 800GBASE-KR8 or 800GBASE-CR8<br>0 = PMA/PMD is not negotiated to perform 800GBASE-KR8 or 800GBASE-CR8 | RO |

In Annex 73A, a Clause 73 Next Page (NP) Message code 2 can be defined. Message Next Page of type code 2 can be defined as follows:

73A.2 Message code 2—Technology Ability and FEC extension

The "Technology Ability and FEC extension" message type shall consist of only a Message Next Page. The message code field is 2 (M10:M0=00 0000 0010)

In Clause 73.6.4 Technology Ability Field (TAF), two unused bits (e.g., A20-A21) in the base page can be assigned to indicate that additional bits of the TAF are to be transmitted in a Next Page message code 2. The base page format and the resolution protocol do not need to change.

Referring back to Table 2, bits D41:D42 (A20-A21) of a next page can be specified as follows. D41 can indicate Extended_TAF_1 capability whereby a value of 0b can indicate that a device does not have additional Technology Ability capabilities whereas a value of 1b can indication additional technology ability field bits are defined in Next Page message code 2 which provides "Technology Ability and FEC extension."

D42 can indicate F5 (Extended_FEC_1 capability) whereby a value of 0 can indicate a device does not have additional "FEC extension" capabilities or a value of 1 can indicate the device has additional FEC capability bits defined in Next Page message code 2 which provides "Technology Ability and FEC extension."

Bits D11:D15 can retain their operation per Clause 73.7.7.1. The contents of the unformatted code field U0: U31 can be conveyed using D16:D47 can be as defined as follows. The Extended_TAF_1[0:27] field can be 28 bits, spanning [D16:D43]. Table 5 depicts an example of capabilities definitions.

TABLE 5

| Bit Number | Dx | Capability Supported |
|---|---|---|
| Bit 0 | D16 | 800G-R4 |
| Bit 1 | D17 | 1.6T-R8 or 1600G-R8 |
| Bit 2 | D18 | 200G-R1 |
| Bit 3 | D19 | 400G-R2 |
| Bits [4:27] | D21:D43 | reserved for future use |

In this example, bit 0 does not indicate capability to support 800G-R8 because A19 of the link codeword Base Page indicates support for 800G-R8.

The Extended_FEC_1 [0:3] field can be 4 bits, spanning [D44:D47] can be bits reserved for future use.

FIG. 2A is a block diagram illustrating Ethernet port circuitry in a network interface controller 50. The Ethernet port logic includes a Media Access Control (MAC) module 52, a reconciliation sublayer module 54 and a PHY module 56. The PHY module 56 can include a physical medium attachment (PMA) sublayer module 62, Physical Medium Dependent (PMD) sublayer 64, a forward error correction (FEC) module 60 and a physical coding sublayer (PCS) module 58.

Auto-Negotiation (AN) circuitry 66 can perform AN in a manner consistent with FIG. 73-1 of IEEE 802.3-2022. For example, AN circuitry 66 can advertise technology and FEC capabilities to a link partner using a base page and next page of message code 2, as described herein. In some examples, AN circuitry 66 can advertise capability to support 800 GbE PHY, as described herein.

MAC module 52 is configured to transfer data to and from the PHY module 56. The Reconciliation Sublayer (RS) module 54 can provide a mapping operation that reconciles the signals at a Media Independent Interface (MII) to the Media Access Control (MAC)-Physical Signaling Sublayer (PLS) service definitions. MAC module 52 can be configured to implement aspects of the MAC layer operations and the RS module 54 can be configured to implement reconciliation sublayer operations.

Physical Medium Dependent (PMD) sublayer 64 can be responsible for interfacing to transmission medium, Medium Dependent Interface (MDI) 80.

Physical Medium Attachment (PMA) sublayer 62 can perform transmission, reception, signal detection, clock recovery and skew alignment. PMD 64 and PMA 62 can be configured to transmit and receive serial data over the MDI 80.

In some examples, PMD 64 and PMA 62 can include or use a serializer de-serializer (SerDes). In some examples, link training and re-training can be provided to adjust filter parameters of a transmit and/or receive equalizer used by a SerDes. For example, a software SerDes driver executed by a processor in a host or a network interface can be used to change a transmit equalizer parameter. In some examples, any combination of hardware, software and/or firmware can be used to manage and perform link training and/or link re-training.

In some examples (e.g., for 100GBASE-CR1 or 100GBASE-KR1), FEC module 60 may decode data passed from the PMD 64 and PMA 62 to the PCS module 58 or encode data passed from the PCS module 58 to the PMD 64 and PMA 62*a*, 62*b*. In some examples, (e.g., for 200G and 400G modes), PCS module 58 includes FEC module 60. Forward error correction code may improve the reliability of data transmission at higher line speeds.

In the transmit direction, MAC module receives data to be transmitted over a host interface 70. MAC module 52 can receive data to be transmitted over a host interface 70. MAC module 52 can generate the MAC frame that includes inter-packet gap (IPG), preamble, start of frame delimiter (SFD), padding, and Cyclic Redundancy Check (CRC) bits in addition to the received data before passing the MAC frame to the PHY module 56. The PHY module 56 can encode the MAC frame for reliable serial transmission over the MDI 80.

In the receive direction, MAC module 52 can receive MAC frames over a data bus from PHY module 56. MAC module 52 can perform Ethernet frame detection and validation, cyclic redundancy check (CRC) validation, update statistics counters, strip out the CRC, preamble detection and removal, and start of frame delimiter (SFD) detection and removal, and forward the rest of the MAC frame that includes headers for other protocols to a next layer (for example, an Internet protocol (IP) layer) for processing. The PHY module 56 can decode the MAC frame received over the MDI 80.

Figure 2B:
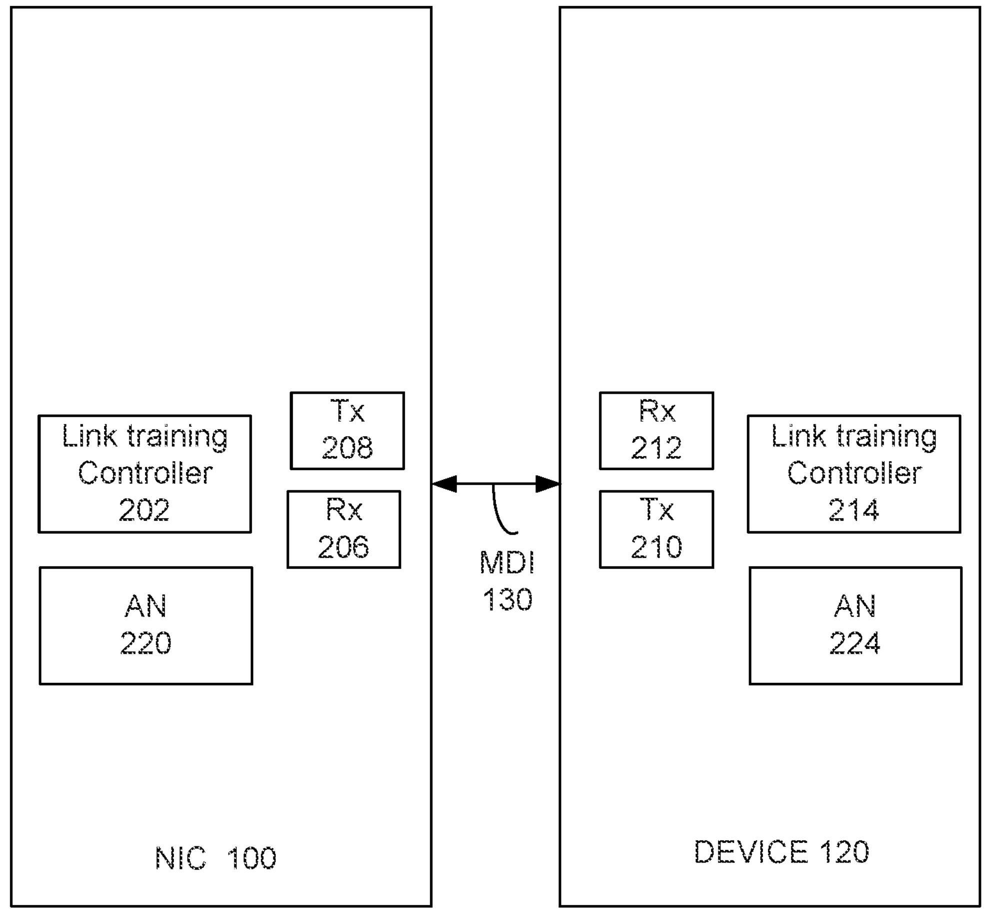
FIG. 2B depicts an example system.

FIG. 2B illustrates a simplified example of a transmitter-receiver pair for between a network interface controller 100 and a device 120. MDI 130 provides a link between network interface controller 100 and device 120 by transferring data in parallel over one or more lanes. Device 120 can be any device such as another NIC, a switch, router, a server, a host computing platform, and so forth. AN can be performed using AN 220 and 224.

Network interface controller 100 can include a host receiver 206 and a host transmitter 208 for at least one lane of an electrical link between the network interface controller 100 and device 120. Device 120 can include a module receiver 212 and module transmitter 210 for an electrical link between network interface controller 100 and device 120.

For example, link training controller 202 of NIC 100 can initiate or manage link establishment, link training, or link re-training operations as described herein. Link training controller 202 can be implemented as any or a combination of: a driver, microcontroller, or other software in a host or network interface.

Transmitter (Tx) 208/210 or receiver (Rx) 206/212 can use a SerDes to serialize or deserialize a signal. When a SerDes is turned on and a signal is received, Rx tuning can be used to improve the signal quality. When there is a time limit to perform Rx tuning, a signal is to be passed to a PCS layer within the time limit and the link comes-up if the link is acceptable. If the link does not pass, training can be restarted. In some examples, Tx 208-Rx 212 and/or Tx 210-Rx 206 can utilize independent Rx tuning. In some examples, an amount of time to perform equalizer tuning is the same for Tx 208-Rx 212 and Tx 210-Rx 206.

During AN, AN 220 can advertise technology and FEC capabilities to a link partner (device 120) using a base page and next page of message code 2, as described herein. In some examples, AN 220 can advertise capability to support 800 GbE PHY, as described herein. AB 224 can perform similar operations as that of AN 220 with NIC 100.

When auto-negotiation is used to establish link between two Ethernet ports an IEEE defined procedure is followed. First, a "link codeword base page" exchange can be performed to determine common capabilities and select an operating mode (e.g., link speed (e.g., 1000BASE-KX, 10GBASE-KX4 . . . 100GBASE-CR4 and so forth), FEC mode, pause capability, and so forth). Link operating mode capability information can indicate at least one 800G-R8 operating mode. Next, a next page exchange phase can occur. The Auto-Negotiation Arbitration state diagram shown in IEEE Std. 802.3-2022 FIG. 73-11 can be followed. Next page exchange can be used, for example, to advertise IEEE capabilities as well as non-IEEE capabilities such as the Ethernet Technology Consortium modes. At the end of next page exchange, the selected operating mode can be configured and a link-training phase can begin. During this link training phase, changes in the peer transmit (e.g., Tx 208 or Tx 210) equalization settings and monitoring the effect on link quality at the receiver (e.g., Rx 206 or Rx 212) and adjusting equalization settings to optimize the link can occur.

According to various examples, link training controller 202 can attempt to achieve link with another device (e.g., device 120) by use of IEEE 802.3 Clause 73 Auto-Negotiation to determine the highest common speed then use the PMD Control Function (e.g., "link training") protocol to train the receivers for the channel impairments in accordance with various examples described herein. In some examples, link training controller 202 can attempt to achieve link with another device (e.g., device 120) and bypass the IEEE 802.3 Clause 73 Auto-Negotiation protocol and apply the PMD Control Function protocol in accordance with various examples described herein. For example, minimum supported features can be applied between links where capabilities of endpoints are known and connected together to perform synchronization. Capabilities of device can be known to the devices by sharing via a pervasive management agent, a previous link establishment, previously applied AN whereby device capabilities are learned, or other manners. Likewise, link training controller 214 can attempt to achieve link with another device (e.g., NIC 100) in a similar manner as that of link training controller 202.

Communications between devices can occur using any protocol. For example, Ethernet frames can be sent by NIC 100 to device 120. For example, Ethernet frames can be sent by device 120 to NIC 100. An Ethernet frame can include one or more of: a preamble, start of frame delimiter (SFD), destination MAC address, source MAC address, EtherType field, length field, frame check sequence (e.g., cyclic redundancy check (CRC)), and payload.

Figure 2C:
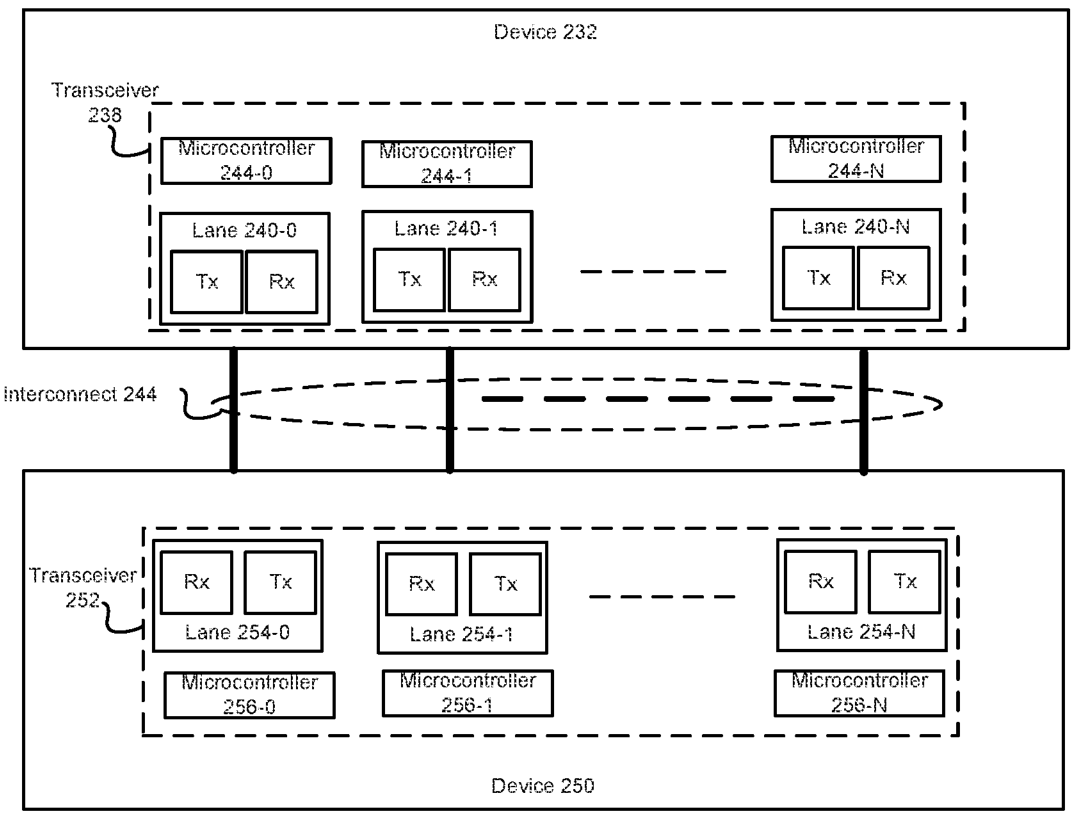
FIG. 2C depicts an example system.

FIG. 2C depicts an example system for communicatively coupling a network device to another network device. For example, device 250 and device 232 can include a network device such as one or more of: a network interface, switch, router, server, host computing platform, interconnect, fabric, rack, or any computing or communications device. For example, device 232 can be connected to an interface with multiple electrical links (e.g., backplane or copper cable). The system provides for multiple lanes of transmit-receive pairs that can be used to transmit or receive electrical signals between device 250 and device 232. A lane can transmit and/or receive a signal. A transmitter of a lane can use an equalizer implemented in an analog circuit to generate an electrical signal for transmission. The equalizer can have one or more current sources that are used to create a signal whereby weights of current sources can be adjusted to change signal characteristics. Equalizer settings can be modified to change weights of current sources. For example, a digital-to-analog converter (DAC) can be used to create signal in the digital domain and output the result in an analog format.

Lane 254-*x* and 240-*x* could perform the AN feature. Those lanes may or may not be controlled by the microcontroller 244-0 to 244-N and 256-0 to 256-N in which the microcontroller performs or supervises the AN function.

During AN, transceiver 238 can advertise technology and FEC capabilities to a link partner (device 250) using a base page and next page of message code 2, as described herein. In some examples, transceiver 238 can advertise capability to support 800 GbE PHY, as described herein. Transceiver 252 can perform similar operations as that of transceiver 238 with device 232.

Various examples use one or more of microcontrollers 244-0 to 244-N of device 232 to initiate and manage link training of transmitter and/or receiver equalizer settings with any of microcontrollers 256-0 to 256-N of device 250.

Transceiver 238 can be used for electrical signal transmission and receipt between device 232 and device 250. Transceiver 238 can provide multiple transmit and receive lanes for electrical signal communication between device 232 and device 250. For example, lanes 240-0 to 240-N can provide transmit and receive circuitry for coupling with receive and transmit circuitry of lanes 254-0 to 254-N of device 250. Lanes 240-0 to 240-N can provide serializer/deserializer (SerDes) formatting of signals. In some examples, transceiver 238 can be part of a PMD or PHY.

Device 232 can be communicatively coupled to device 250 by an interconnect 244. Interconnect 244 can be electrical signal conductors that couple pins or holes of lanes 240-0 to 240-N of a pluggable device 232 to holes or pins of lanes 254-0 to 254-N of device 250. Device 250 can transmit or receive signals in electrical format to or from device 232.

Device 250 can include transceiver 252 for communication with device 232. Transceiver 252 can include lanes 254-0 to 254-N where any of lanes 254-0 to 254-N includes receive and transmit circuitry. In some examples, transceiver 252 can be part of a PMD or PHY. Any microcontroller 256-0 to 256-N can be used to manage operation of its lane.

In some examples, a single microcontroller can manage equalizer settings of one or multiple lanes. The one or more parameters can cause a receiver or transmitter device in any of lanes 254-0 to 254-N to adjust its equalizer setting for a specific tap, whether to increase or decrease the coefficient value of an equalizer tap. In some examples, the settings of a tap can be adjusted independent of adjustment of settings of another tap.

In some examples, device 250 can request to change an equalizer setting of any tap of a transmitter equalizer circuit of device 232. Likewise, device 232 can request to change an equalizer setting of any tap of a transmitter equalizer circuit of device 250. Accordingly, device 232 and device 250 can adjust transmitter equalizer settings used by a partner device. Moreover, any of device 232 and device 250 can adjust receiver equalizer settings to compensate for channel distortions.

For example, to initiate an equalizer setting change, any microcontroller 244-0 to 244-N can determine a signal quality of a received signal and determine what transmitter side tap of device 250 to change and whether to increment or decrement the setting of the tap. For example, an eye opening of a received signal can be measured. An eye can represent 1-to-0 and 0-to-1 transitions of a signal and indicate whether the transitions occur within isolated time regions. A microcontroller can estimate inter-symbol interference (ISI) and select settings based on an ISI reaching a minimum value. A microcontroller can search through available transmitter tap settings and select settings that lead to a most open eye. Transmitter equalizer settings can be changed periodically starting at or after link startup and can run periodically. Similar operations can occur for microcontroller 256-0 to 256-N to adjust transmit equalizer settings of device 232.

Device 232 and/or device 250 can perform packet processing such as one or more of: media access control, any protocol layer processing, security, routing, destination lookup, and so forth.

Figure 3:
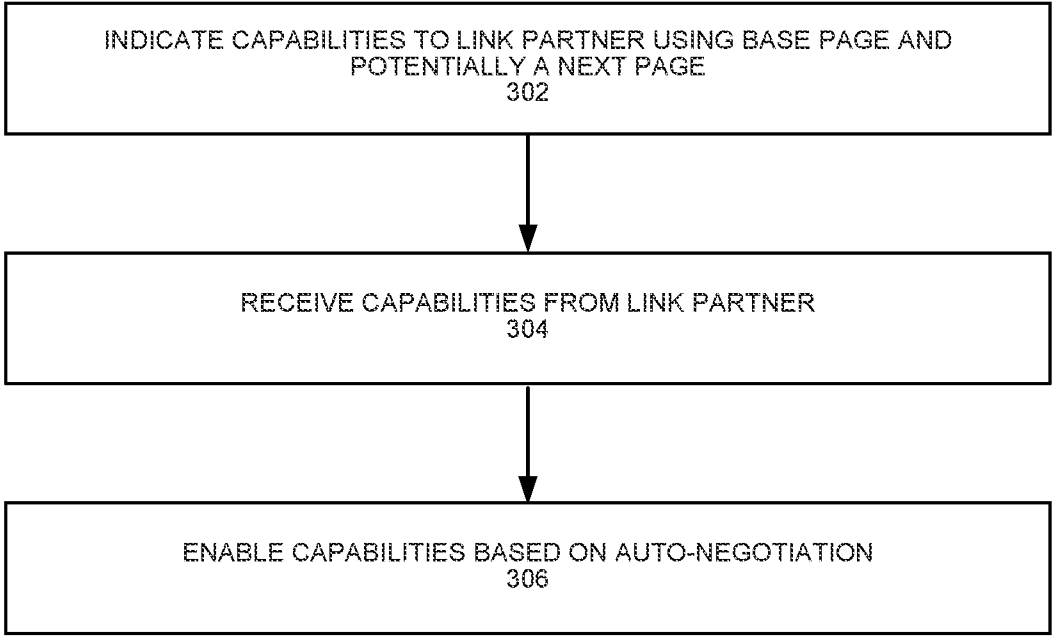
FIG. 3 depicts an example process.

FIG. 3 depicts an example process. The process can be performed by a network interface with Ethernet PHY circuitry to perform auto-negotiation or negotiation with a remote link partner of capabilities. The process can be performed by a PHY of a network interface. One or both link partners can perform the process of FIG. 3 to determine one or more link operating mode capabilities and FEC modes to enable. At 302, a network interface can generate a base page and potentially a next page to advertise capabilities and send the base page and, if generated, a next page, to a link partner. The capabilities can be stored as by one or both network interfaces as negotiation-related information. In some examples, a position A19 of a base page can be used to indicate capability to support 800G-R8 operating mode or 800G-R8 link status information, which can include 800GBASE-CR8 (for copper cable interface) or 800GBASE-KR8 (backplane interface). Other positions in the base page can indicate other capabilities. In some examples, positions A19-A21 of the base page can indicate additional technology abilities are defined in a next page having message code 2 and position in D16 of the next page having message code 2 can indicate support for 800G-R8, which can include 800GBASE-CR8 (for copper cable interface) or 800GBASE-KR8 (backplane interface).

At 304, the network interface can receive capabilities supported by a link partner from the link partner. For example, capabilities can be specified in a base page and potentially one or more next pages. In some examples, the link partner can indicate capability to support 800G-R8 in a base page (e.g., A19) or in a next page of message code 2.

At 306, the network interface can enable capabilities based on auto-negotiation of capabilities with a link partner. For example, the network interface can enable highest common capabilities or highest available operating mode supported by the link partners. However, in some cases, such as where configured by an operating system (OS) or driver, the network interface and its link partner can enable less than the highest common capabilities supported by the link partners. For example, operating mode capabilities of the Ethernet PHY circuitry and the remote link partner are to be set before expiration of at least one time value defined by timer values. For example, devices supporting 800GBASE-CR8 or 800GBASE-KR8 are to set operating mode capabilities within at least 12.3 seconds and at most 12.4 seconds.

Thereafter, communications between the network interface and remote link partner can take place using packets or frame communications.

Figure 4:
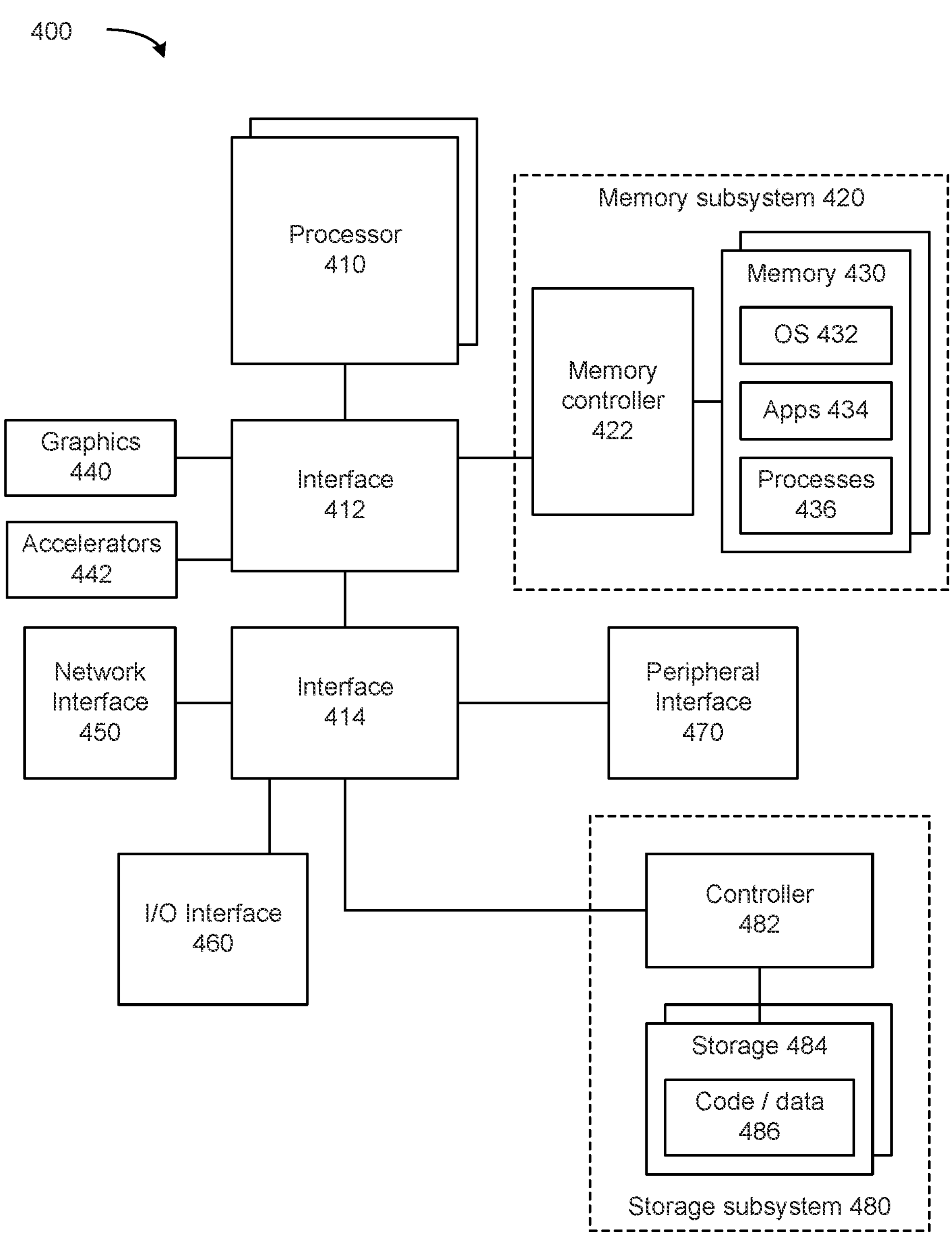
FIG. 4 depicts an example computing system.

FIG. 4 depicts an example computing system. System 400 can be included in a server that is part of a data center. Components of system 400 (e.g., processor 410, network interface 450, and so forth) to perform auto-negotiation of link and FEC capabilities, as described herein. System 400 includes processor 410, which provides processing, operation management, and execution of instructions for system 400. Processor 410 can include any type of microprocessor, central processing unit (CPU), graphics processing unit (GPU), processing core, or other processing hardware to provide processing for system 400, or a combination of processors. Processor 410 controls the overall operation of system 400, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 400 includes interface 412 coupled to processor 410, which can represent a higher speed interface or a high throughput interface for system components that needs higher bandwidth connections, such as memory subsystem 420 or graphics interface components 440, or accelerators 442. Interface 412 represents an interface circuit, which can be a standalone component or integrated onto a processor die. Where present, graphics interface 440 interfaces to graphics components for providing a visual display to a user of system 400. In one example, graphics interface 440 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 440 generates a display based on data stored in memory 430 or based on operations executed by processor 410 or both. In one example, graphics interface 440 generates a display based on data stored in memory 430 or based on operations executed by processor 410 or both.

Accelerators 442 can be a fixed function or programmable offload engine that can be accessed or used by a processor 410. For example, an accelerator among accelerators 442 can provide compression (DC) capability, cryptography services such as public key encryption (PKE), cipher, hash/authentication capabilities, decryption, or other capabilities or services. In some examples, in addition or alternatively, an accelerator among accelerators 442 provides field select controller capabilities as described herein. In some cases, accelerators 442 can be integrated into a CPU socket (e.g., a connector to a motherboard or circuit board that includes a CPU and provides an electrical interface with the CPU). For example, accelerators 442 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 442 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 420 represents the main memory of system 400 and provides storage for code to be executed by processor 410, or data values to be used in executing a routine. Memory subsystem 420 can include one or more memory devices 430 such as read-only memory (ROM), flash memory, one or more varieties of random access memory (RAM) such as DRAM, or other memory devices, or a combination of such devices. Memory 430 stores and hosts, among other things, operating system (OS) 432 to provide a software platform for execution of instructions in system 400. Additionally, applications 434 can execute on the software platform of OS 432 from memory 430. Applications 434 represent programs that have their own operational logic to perform execution of one or more functions. Processes 436 represent agents or routines that provide auxiliary functions to OS 432 or one or more applications 434 or a combination. OS 432, applications 434, and processes 436 provide software logic to provide functions for system 400. In one example, memory subsystem 420 includes memory controller 422, which is a memory controller to generate and issue commands to memory 430. It will be understood that memory controller 422 could be a physical part of processor 410 or a physical part of interface 412. For example, memory controller 422 can be an integrated memory controller, integrated onto a circuit with processor 410.

In some examples, OS 432 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others.

In some examples, OS 432 or driver for network interface 450 can enable or disable network interface 450 indicating support for 800GBASE-CR8 or 800GBASE-KR8 capabilities in a base page during AN. In some examples, OS 432 or driver for network interface 450 can enable or disable network interface 450 indicating support for extended technology ability or FEC capability in a next page during AN. In some examples, OS 432 or driver for network interface 450 can configure network interface 450 to advertise, during AN, less than a full set of features supported by network interface 450 or advertise, during AN, a full set of features supported by network interface 450.

While not specifically illustrated, it will be understood that system 400 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 400 includes interface 414, which can be coupled to interface 412. In one example, interface 414 represents an interface circuit, which can include standalone components and integrated circuitry. In one example, multiple user interface components or peripheral components, or both, couple to interface 414. Network interface 450 provides system 400 the ability to communicate with remote devices (e.g., servers or other computing devices) over one or more networks. In some examples, network interface 450 can refer to one or more of: a network interface controller (NIC), a remote direct memory access (RDMA)-enabled NIC, SmartNIC, router, switch, forwarding element, infrastructure processing unit (IPU), data processing unit (DPU), or network-attached appliance.

Network interface 450 can include an Ethernet adapter, wireless interconnection components, cellular network interconnection components, USB (universal serial bus), or other wired or wireless standards-based or proprietary interfaces. Network interface 450 can transmit data to a device that is in the same data center or rack or a remote device, which can include sending data stored in memory.

Some examples of network interface 450 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Some examples of network interface 450 can include a programmable packet processing pipeline with one or multiple consecutive stages of match-action circuitry. The programmable packet processing pipeline can be programmed using one or more of: Protocol-independent Packet Processors (P4), Software for Open Networking in the Cloud (SONIC), Broadcom® Network Programming Language (NPL), NVIDIA® CUDAR, NVIDIA® DOCA™, Data Plane Development Kit (DPDK), OpenDataPlane (ODP), Infrastructure Programmer Development Kit (IPDK), x86 compatible executable binaries or other executable binaries, or others.

Some examples of network interface 450 can include PHY circuitry that can perform AN with one or more link partners to advertise capabilities, discover capabilities, and apply common capabilities, as described herein.

In one example, system 400 includes one or more input/output (I/O) interface(s) 460. I/O interface 460 can include one or more interface components through which a user interacts with system 400 (e.g., audio, alphanumeric, tactile/touch, or other interfacing). Peripheral interface 470 can include any hardware interface not specifically mentioned above. Peripherals refer generally to devices that connect dependently to system 400. A dependent connection is one where system 400 provides the software platform or hardware platform or both on which operation executes, and with which a user interacts.

In one example, system 400 includes storage subsystem 480 to store data in a nonvolatile manner. In one example, in certain system implementations, at least certain components of storage 480 can overlap with components of memory subsystem 420. Storage subsystem 480 includes storage device(s) 484, which can be or include any conventional medium for storing large amounts of data in a non-volatile manner, such as one or more magnetic, solid state, or optical based disks, or a combination. Storage 484 holds code or instructions and data 486 in a persistent state (e.g., the value is retained despite interruption of power to system 400). Storage 484 can be generically considered to be a "memory," although memory 430 is typically the executing or operating memory to provide instructions to processor 410. Whereas storage 484 is nonvolatile, memory 430 can include volatile memory (e.g., the value or state of the data is indeterminate if power is interrupted to system 400). In one example, storage subsystem 480 includes controller 482 to interface with storage 484. In one example controller 482 is a physical part of interface 414 or processor 410 or can include circuits or logic in both processor 410 and interface 414.

A volatile memory is memory whose state (and therefore the data stored in it) is indeterminate if power is interrupted to the device. A non-volatile memory (NVM) device is a memory whose state is determinate even if power is interrupted to the device.

A power source (not depicted) provides power to the components of system 400. More specifically, power source typically interfaces to one or multiple power supplies in system 400 to provide power to the components of system 400. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 400 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (ROCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Communications between devices can take place using a network, interconnect, or circuitry that provides chip-to-chip communications, die-to-die communications, packet-based communications, communications over a device interface, fabric-based communications, and so forth. A die-to-die communications can be consistent with Embedded Multi-Die Interconnect Bridge (EMIB).

FIG. 5 depicts a network interface that can use examples or be used by examples. Various resources in the network interface can perform link establishment, link training or link re-training in accordance with examples described herein. Network interface 500 can include transceiver 502, processors 504, FPGA 505, transmit queue 506, receive queue 508, memory 510, and bus interface 512, and DMA engine 552. Transceiver 502 can be capable of receiving and transmitting packets in conformance with the applicable protocols such as Ethernet as described in IEEE 502.3, although other protocols may be used. Transceiver 502 can receive and transmit packets from and to a network via a network medium (not depicted). Transceiver 502 can include PHY circuitry 514 and media access control (MAC) circuitry 516. PHY circuitry 514 can include encoding and decoding circuitry (not shown) to encode and decode data packets according to applicable physical layer specifications or standards. PHY 514 could perform AN function with base pages and next pages. During AN, capability to perform 800GBASE-CR8 (copper) or 800GBASE-KR8 (backplane) (not both) or other PHY types can be advertised using bits A19-A21 as described herein.

MAC circuitry 516 can be configured to assemble data to be transmitted into packets, that include destination and source addresses along with network control information and error detection hash values. Processors 504 can be any a combination of a: processor, core, graphics processing unit (GPU), field programmable gate array (FPGA), application specific integrated circuit (ASIC), or other programmable hardware device that allow programming of network interface 500. For example, a "smart network interface" can provide packet processing capabilities in the network interface using processors 504 or FPGA 505.

Packet allocator 524 can provide distribution of received packets for processing by multiple CPUs or cores using timeslot allocation described herein or RSS. When packet allocator 524 uses RSS, packet allocator 524 can calculate a hash or make another determination based on contents of a received packet to determine which CPU or core is to process a packet.

Interrupt coalesce 522 can perform interrupt moderation whereby network interface interrupt coalesce 522 waits for multiple packets to arrive, or for a time-out to expire, before generating an interrupt to host system to process received packet(s). Receive Segment Coalescing (RSC) can be performed by network interface 500 whereby portions of incoming packets are combined into segments of a packet. Network interface 500 provides this coalesced packet to an application.

Direct memory access (DMA) engine 552 can copy a packet header, packet payload, and/or descriptor directly from host memory to the network interface or vice versa, instead of copying the packet to an intermediate buffer at the host and then using another copy operation from the intermediate buffer to the destination buffer.

Memory 510 can be any type of volatile or non-volatile memory device and can store any queue or instructions used to program network interface 500. Transmit queue 506 can include data or references to data for transmission by network interface. Receive queue 508 can include data or references to data that was received by network interface from a network. Descriptor queues 520 can include descriptors that reference data or packets in transmit queue 506 or receive queue 508. Bus interface 512 can provide an interface with host device (not depicted). For example, bus interface 512 can be compatible with PCI, PCI Express, PCI-x, Serial ATA, and/or USB compatible interface (although other interconnection standards may be used).

In some examples, devices, network interface, and other examples described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Figure 6:
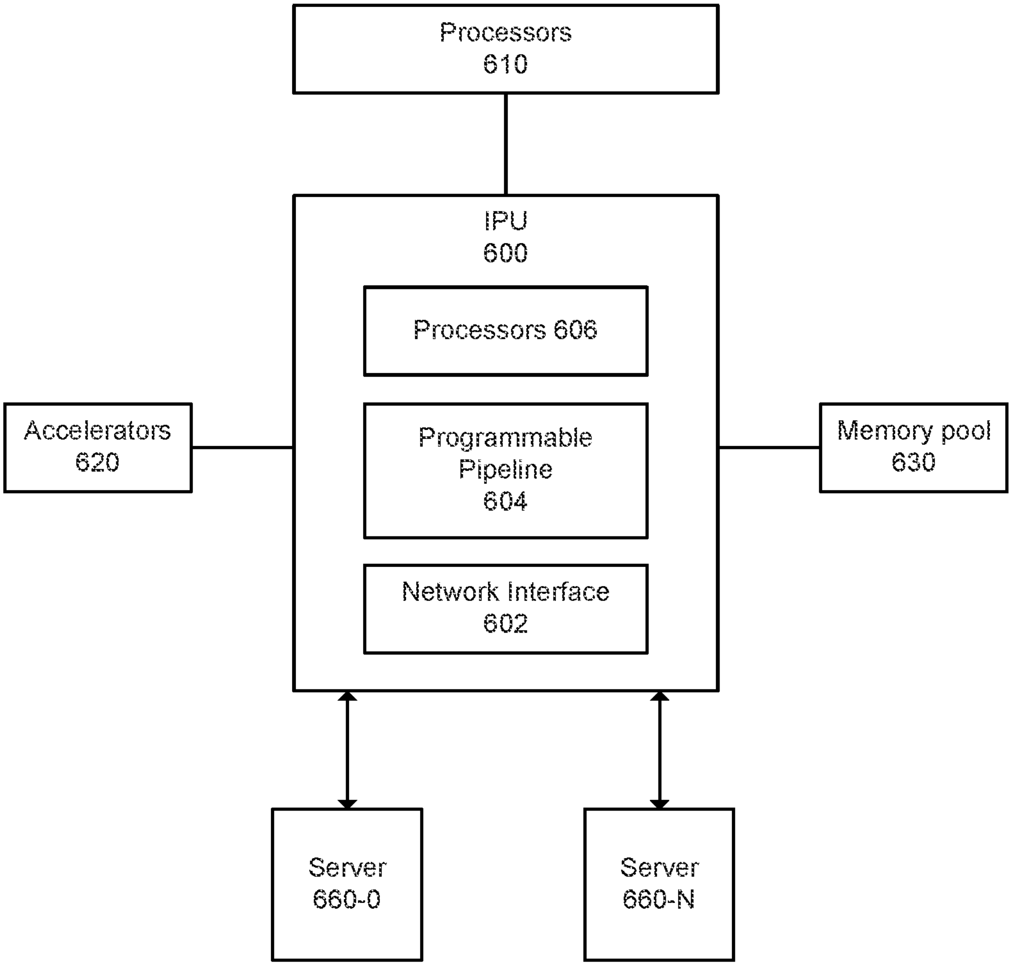
FIG. 6 depicts an example computing system.

FIG. 6 depicts an example system. In this system, IPU 600 manages performance of one or more processes using one or more of processors 606, processors 610, accelerators 620, memory pool 630, or servers 640-0 to 640-N, where N is an integer of 1 or more. In some examples, processors 606 of IPU 600 can execute one or more processes, applications, VMs, containers, microservices, and so forth that request performance of workloads by one or more of: processors 610, accelerators 620, memory pool 630, and/or servers 640-0 to 640-N. IPU 600 can utilize network interface 602 or one or more device interfaces to communicate with processors 610, accelerators 620, memory pool 630, and/or servers 640-0 to 640-N. IPU 600 can utilize programmable pipeline 604 to process packets that are to be transmitted from network interface 602 or packets received from network interface 602. IPU 600 can include PHY circuitry that can perform AN with one or more link partners to advertise capabilities, discover capabilities, and apply common capabilities, as described herein.

Examples herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade can include components common to conventional servers, including a main printed circuit board (main board) providing internal wiring (e.g., buses) for coupling appropriate integrated circuits (ICs) and other components mounted to the board.

In some examples, network interface and other examples described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), micro data center, on-premise data centers, off-premise data centers, edge network elements, fog network elements, and/or hybrid data centers (e.g., data center that use virtualization, serverless computing systems (e.g., Amazon Web Services (AWS) Lambda), content delivery networks (CDN), cloud and software-defined networking to deliver application workloads across physical data centers and distributed multi-cloud environments).

For example, link establishment, link training or link re-training can be applied by a base station that supports communications using wired or wireless protocols (e.g., 3GPP Long Term Evolution (LTE) (4G) or 3GPP 5G), on-premises data centers, off-premises data centers, edge network elements (computing elements provided physically closer to a base station or network access point than a data center), fog network elements (computing elements provided physically closer to a base station or network access point than a data center but further from an edge network), and/or hybrid data centers (e.g., data center that use virtualization, cloud and software-defined networking to deliver application workloads across physical data centers and distributed multi-cloud environments). Network or computing elements can be used in local area network (LAN), metropolitan area network (MAN), network with devices connected using optical fiber links, campus area network (CAN), or wide area network (WAN).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in an example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative examples. Furthermore, additional operations may be added or removed depending on the particular applications. Any combination of changes can be used and one of ordinary skill in the art with the benefit of this disclosure would understand the many variations, modifications, and alternative examples thereof.

Disjunctive language such as the phrase "at least one of X, Y, or Z," unless specifically stated otherwise, is otherwise understood within the context as used in general to present that an item, term, etc., may be either X, Y, or Z, or combination thereof (e.g., X, Y, and/or Z). Thus, such disjunctive language is not generally intended to, and should not, imply that certain examples require at least one of X, at least one of Y, or at least one of Z to each be present. Additionally, conjunctive language such as the phrase "at least one of X, Y, and Z," unless specifically stated otherwise, should also be understood to mean X, Y, Z, or combination thereof, including "X, Y, and/or Z."

Illustrative examples of the devices, systems, and methods disclosed herein are provided below. An example of the devices, systems, and methods may include one or more, and combination of, the examples described below.

Example 1 includes one or more examples and an Ethernet physical layer transceiver (PHY) circuitry for use in frame communication with a remote link partner, the Ethernet PHY circuitry also to communicate with local medium access controller (MAC) circuitry, the Ethernet PHY circuitry comprising: physical coding sublayer (PCS) circuitry for use in communicating with the local MAC circuitry; and transmitter circuitry and receiver circuitry for use in the frame communication; wherein: when the Ethernet PHY circuitry is in operation, the transmitter circuitry, during at least one negotiation with the remote link partner, is to transmit link codeword page information that comprises link operating mode capability information that indicates at least one 800G-R8 operating mode; the Ethernet PHY circuitry is to determine a capability priority resolution that is configurable, based upon the at least one negotiation, to reflect the at least one 800G-R8 operating mode; the Ethernet PHY circuitry is to determine link status information that is configurable, based upon the at least one negotiation, to comprise 800G-R8 link status information; the at least one 800G-R8 operating mode is associated with timer values; operating mode capabilities of the Ethernet PHY circuitry and the remote link partner are to be set before expiration of at least one time value defined by the timer values; and the Ethernet PHY circuitry is to store negotiation-related information that is configurable, based upon the at least one negotiation, to indicate whether the Ethernet PHY circuitry is to operate in the at least one 800G-R8 operating mode.

Example 2 includes one or more examples, wherein: the at least one negotiation comprises an auto-negotiation between the Ethernet PHY circuitry and the remote link partner; and the auto-negotiation is to result in the Ethernet PHY circuitry selecting a highest available operating mode that is common to both the Ethernet PHY circuitry and the remote link partner.

Example 3 includes one or more examples, wherein: the Ethernet PHY circuitry comprises physical medium attachment (PMA) circuitry and physical medium dependent (PMD) circuitry; the at least one 800G-R8 operating mode comprises an 800GBASE-KR8 operating mode or an 800GBASE-CR8 operating mode to be implemented, at least in part, via the PMD circuitry; and the negotiation-related information is configurable, based upon the at least one negotiation, to indicate whether the PMD circuitry and/or PMA circuitry are to operate in the at least one 800G-R8 operating mode.

Example 4 includes one or more examples, wherein: the link operating mode capability information that indicates at least one 800G-R8 operating mode comprises technology ability field information indicated via technology ability field bit A19.

Example 5 includes one or more examples, wherein: the link operating mode capability information that indicates at least one 800G-R8 operating mode is to be transmitted via bit D40 of the link codeword page information.

Example 6 includes one or more examples, wherein: the link codeword page information also comprises forward error correction (FEC) operating mode capability information; and the FEC operating mode capability information is for use in determining, at least in part, at least one FEC operating mode capability of the Ethernet PHY circuitry.

Example 7 includes one or more examples and a method implemented using ethernet physical layer transceiver (PHY) circuitry, the Ethernet PHY circuitry being for use in frame communication with a remote link partner, the Ethernet PHY circuitry also to communicate with local medium access controller (MAC) circuitry, the Ethernet PHY circuitry comprising physical coding sublayer (PCS) circuitry, transmitter circuitry, and receiver circuitry, the method comprising: using the PCS circuitry in communicating with the local MAC circuitry; and using the transmitter circuitry and the receiver circuitry in the frame communication; wherein: when the Ethernet PHY circuitry is in operation, the transmitter circuitry, during at least one negotiation with the remote link partner, is to transmit link codeword page information that comprises link operating mode capability information that indicates at least one 800G-R8 operating mode; the Ethernet PHY circuitry is to determine a capability priority resolution that is configurable, based upon the at least one negotiation, to reflect the at least one 800G-R8 operating mode; the Ethernet PHY circuitry is to determine link status information that is configurable, based upon the at least one negotiation, to comprise 800G-R8 link status information; the at least one 800G-R8 operating mode is associated with timer values; operating mode capabilities of the Ethernet PHY circuitry and the remote link partner are to be set before expiration of at least one time value defined by the timer values; and the Ethernet PHY circuitry is to store negotiation-related information that is configurable, based upon the at least one negotiation, to indicate whether the Ethernet PHY circuitry is to operate in the at least one 800G-R8 operating mode.

Example 8 includes one or more examples, wherein: the at least one negotiation comprises an auto-negotiation between the Ethernet PHY circuitry and the remote link partner; and the auto-negotiation is to result in the Ethernet PHY circuitry selecting a highest available operating mode that is common to both the Ethernet PHY circuitry and the remote link partner.

Example 9 includes one or more examples, wherein: the Ethernet PHY circuitry comprises physical medium attachment (PMA) circuitry and physical medium dependent (PMD) circuitry; the at least one 800G-R8 operating mode comprises an 800GBASE-KR8 operating mode or an 800GBASE-CR8 operating mode to be implemented, at least in part, via the PMD circuitry; and the negotiation-related information is configurable, based upon the at least one negotiation, to indicate whether the PMD circuitry and/or PMA circuitry are to operate in the at least one 800G-R8 operating mode.

Example 10 includes one or more examples, wherein: the link operating mode capability information that indicates at least one 800G-R8 operating mode comprises technology ability field information indicated via technology ability field bit A19.

Example 11 includes one or more examples, wherein: the link operating mode capability information that indicates at least one 800G-R8 operating mode is to be transmitted via bit D40 of the link codeword page information.

Example 12 includes one or more examples, wherein: the link codeword page information also comprises forward error correction (FEC) operating mode capability information; and the FEC operating mode capability information is for use in determining, at least in part, at least one FEC operating mode capability of the Ethernet PHY circuitry.

Example 13 includes one or more examples and at least one non-transitory machine-readable storage medium storing instructions that are executable by ethernet physical layer transceiver (PHY) circuitry, the Ethernet PHY circuitry being for use in frame communication with a remote link partner, the Ethernet PHY circuitry also to communicate with local medium access controller (MAC) circuitry, the Ethernet PHY circuitry comprising physical coding sublayer (PCS) circuitry, transmitter circuitry, and receiver circuitry, the instructions, when executed by the Ethernet PHY circuitry resulting in the Ethernet PHY circuitry being configured for performance of operations comprising: using the PCS circuitry in communicating with the local MAC circuitry; and using the transmitter circuitry and the receiver circuitry in the frame communication; wherein: when the Ethernet PHY circuitry is in operation, the transmitter circuitry, during at least one negotiation with the remote link partner, is to transmit link codeword page information that comprises link operating mode capability information that indicates at least one 800G-R8 operating mode; the Ethernet PHY circuitry is to determine a capability priority resolution that is configurable, based upon the at least one negotiation, to reflect the at least one 800G-R8 operating mode; the Ethernet PHY circuitry is to determine link status information that is configurable, based upon the at least one negotiation, to comprise 800G-R8 link status information; the at least one 800G-R8 operating mode is associated with timer values; operating mode capabilities of the Ethernet PHY circuitry and the remote link partner are to be set before expiration of at least one time value defined by the timer values; and the Ethernet PHY circuitry is to store negotiation-related information that is configurable, based upon the at least one negotiation, to indicate whether the Ethernet PHY circuitry is to operate in the at least one 800G-R8 operating mode.

Example 14 includes one or more examples, wherein: the at least one negotiation comprises an auto-negotiation between the Ethernet PHY circuitry and the remote link partner; and the auto-negotiation is to result in the Ethernet PHY circuitry selecting a highest available operating mode that is common to both the Ethernet PHY circuitry and the remote link partner.

Example 15 includes one or more examples, wherein: the Ethernet PHY circuitry comprises physical medium attachment (PMA) circuitry and physical medium dependent (PMD) circuitry; the at least one 800G-R8 operating mode comprises an 800GBASE-KR8 operating mode or an 800GBASE-CR8 operating mode to be implemented, at least in part, via the PMD circuitry; and the negotiation-related information is configurable, based upon the at least one negotiation, to indicate whether the PMD circuitry and/or PMA circuitry are to operate in the at least one 800G-R8 operating mode.

Example 16 includes one or more examples, wherein: the link operating mode capability information that indicates at least one 800G-R8 operating mode comprises technology ability field information indicated via technology ability field bit A19.

Example 17 includes one or more examples, wherein: the link operating mode capability information that indicates at least one 800G-R8 operating mode is to be transmitted via bit D40 of the link codeword page information.

Example 18 includes one or more examples, wherein: the link codeword page information also comprises forward error correction (FEC) operating mode capability information; and the FEC operating mode capability information is for use in determining, at least in part, at least one FEC operating mode capability of the Ethernet PHY circuitry.

Example 19 includes one or more examples and a network interface controller circuitry for use in frame communication with a remote link partner, the network interface controller circuitry also being for use in association with one or more of at least one operating system, at least one driver, and/or at least one application, the network interface controller circuitry comprising: Ethernet physical layer transceiver (PHY) circuitry to communicate with local medium access controller (MAC) circuitry, the Ethernet PHY circuitry comprising: physical coding sublayer (PCS) circuitry for use in communicating with the local MAC circuitry; and transmitter circuitry and receiver circuitry for use in the frame communication; wherein: when the Ethernet PHY circuitry is in operation, the Ethernet PHY circuitry is configurable, at least in part, based upon configuration data to be provided via the one or more of the at least one operating system, the at least one driver, and/or the at least one application, to enable or disable one or more of the following: transmission via the transmitter circuitry, during at least one negotiation with the remote link partner, of link codeword page information that comprises link operating mode capability information that indicates at least one 800G-R8 operating mode; determination by the Ethernet PHY circuitry of a capability priority resolution that is configurable, based upon the at least one negotiation, to reflect the at least one 800G-R8 operating mode; determination by the Ethernet PHY circuitry of link status information that is configurable, based upon the at least one negotiation, to comprise 800G-R8 link status information; setting of operating mode capabilities of the Ethernet PHY circuitry and the remote link partner before expiration of at least one time value defined by timer values associated with the at least one 800G-R8 operating mode; and/or storage by the Ethernet PHY circuitry of negotiation-related information that is configurable, based upon the at least one negotiation, to indicate whether the Ethernet PHY circuitry is to operate in the at least one 800G-R8 operating mode.

Example 20 includes one or more examples, wherein: the at least one negotiation comprises an auto-negotiation between the Ethernet PHY circuitry and the remote link partner; the auto-negotiation is to result in the Ethernet PHY circuitry selecting a highest available operating mode that is common to both the Ethernet PHY circuitry and the remote link partner; the Ethernet PHY circuitry comprises physical medium attachment (PMA) circuitry and physical medium dependent (PMD) circuitry; the at least one 800G-R8 operating mode comprises an 800GBASE-KR8 operating mode or an 800GBASE-CR8 operating mode implementable, at least in part, via the PMD circuitry; and the negotiation-related information is configurable, based upon the at least one negotiation, to indicate whether the PMD circuitry and/or PMA circuitry are to operate in the at least one 800G-R8 operating mode.

Example 21 includes one or more examples, wherein: the link operating mode capability information that indicates at least one 800G-R8 operating mode comprises technology ability field information indicated via technology ability field bit A19; the link operating mode capability information that indicates at least one 800G-R8 operating mode is for transmission via bit D40 of the link codeword page information; the link codeword page information also comprises forward error correction (FEC) operating mode capability information; and the FEC operating mode capability information is for use in determining, at least in part, at least one FEC operating mode capability of the Ethernet PHY circuitry.

Example 22 includes one or more examples and a server system usable in association with at least one data center, the server system being for use in frame communication with a remote link partner, the server system also being for use in association with one or more of at least one operating system, at least one driver, and/or at least one application, the server system comprising: network interface controller circuitry comprising Ethernet physical layer transceiver (PHY) circuitry to communicate with local medium access controller (MAC) circuitry, the Ethernet PHY circuitry comprising: physical coding sublayer (PCS) circuitry for use in communicating with the local MAC circuitry; and transmitter circuitry and receiver circuitry for use in the frame communication; wherein: when the Ethernet PHY circuitry is in operation, the Ethernet PHY circuitry is configurable, at least in part, based upon configuration data to be provided via the one or more of the at least one operating system, the at least one driver, and/or the at least one application, to enable or disable one or more of the following: transmission via the transmitter circuitry, during at least one negotiation with the remote link partner, of link codeword page information that comprises link operating mode capability information that indicates at least one 800G-R8 operating mode; determination by the Ethernet PHY circuitry of a capability priority resolution that is configurable, based upon the at least one negotiation, to reflect the at least one 800G-R8 operating mode; determination by the Ethernet PHY circuitry of link status information that is configurable, based upon the at least one negotiation, to comprise 800G-R8 link status information; setting of operating mode capabilities of the Ethernet PHY circuitry and the remote link partner before expiration of at least one time value defined by timer values associated with the at least one 800G-R8 operating mode; and/or storage by the Ethernet PHY circuitry of negotiation-related information that is configurable, based upon the at least one negotiation, to indicate whether the Ethernet PHY circuitry is to operate in the at least one 800G-R8 operating mode.

Example 23 includes one or more examples, wherein: the at least one negotiation comprises an auto-negotiation between the Ethernet PHY circuitry and the remote link partner; the auto-negotiation is to result in the Ethernet PHY circuitry selecting a highest available operating mode that is common to both the Ethernet PHY circuitry and the remote link partner; the Ethernet PHY circuitry comprises physical medium attachment (PMA) circuitry and physical medium dependent (PMD) circuitry; the at least one 800G-R8 operating mode comprises an 800GBASE-KR8 operating mode or an 800GBASE-CR8 operating mode implementable, at least in part, via the PMD circuitry; and the negotiation-related information is configurable, based upon the at least one negotiation, to indicate whether the PMD circuitry and/or PMA circuitry are to operate in the at least one 800G-R8 operating mode.

Example 24 includes one or more examples, wherein: the link operating mode capability information that indicates at least one 800G-R8 operating mode comprises technology ability field information indicated via technology ability field bit A19; the link operating mode capability information that indicates at least one 800G-R8 operating mode is for transmission via bit D40 of the link codeword page information; the link codeword page information also comprises forward error correction (FEC) operating mode capability information; and the FEC operating mode capability information is for use in determining, at least in part, at least one FEC operating mode capability of the Ethernet PHY circuitry.

The invention claimed is:

1. Ethernet physical layer transceiver (PHY) circuitry for use in frame communication with a remote link partner, the Ethernet PHY circuitry also to communicate with local medium access controller (MAC) circuitry, the Ethernet PHY circuitry comprising:

physical coding sublayer (PCS) circuitry for use in communicating with the local MAC circuitry; and transmitter circuitry and receiver circuitry for use in the frame communication;

wherein:

when the Ethernet PHY circuitry is in operation, the transmitter circuitry, during at least one negotiation with the remote link partner, is to transmit link codeword page information that comprises link operating mode capability information that indicates at least one 800G-R8 operating mode;

the Ethernet PHY circuitry is to determine a capability priority resolution that is configurable, based upon the at least one negotiation, to reflect the at least one 800G-R8 operating mode;

the Ethernet PHY circuitry is to determine link status information that is configurable, based upon the at least one negotiation, to comprise 800G-R8 link status information;

the at least one 800G-R8 operating mode is associated with timer values;

operating mode capabilities of the Ethernet PHY circuitry and the remote link partner are to be set before expiration of at least one time value defined by the timer values; and the Ethernet PHY circuitry is to store negotiation-related information that is configurable, based upon the at least one negotiation, to indicate whether the Ethernet PHY circuitry is to operate in the at least one 800G-R8 operating mode.

2. The Ethernet PHY circuitry of claim 1, wherein:

the at least one negotiation comprises an auto-negotiation between the Ethernet PHY circuitry and the remote link partner; and the auto-negotiation is to result in the Ethernet PHY circuitry selecting a highest available operating mode that is common to both the Ethernet PHY circuitry and the remote link partner.

3. The Ethernet PHY circuitry of claim 2, wherein:

the Ethernet PHY circuitry comprises physical medium attachment (PMA) circuitry and physical medium dependent (PMD) circuitry;

the at least one 800G-R8 operating mode comprises an 800GBASE-KR8 operating mode or an 800GBASE-CR8 operating mode to be implemented, at least in part, via the PMD circuitry; and the negotiation-related information is configurable, based upon the at least one negotiation, to indicate whether the PMD circuitry and/or PMA circuitry are to operate in the at least one 800G-R8 operating mode.

4. The Ethernet PHY circuitry of claim 3, wherein:

the link operating mode capability information that indicates at least one 800G-R8 operating mode comprises technology ability field information indicated via technology ability field bit A19.

5. The Ethernet PHY circuitry of claim 4, wherein:

the link operating mode capability information that indicates at least one 800G-R8 operating mode is to be transmitted via bit D40 of the link codeword page information.

6. The Ethernet PHY circuitry of claim 3, wherein:

the link codeword page information also comprises forward error correction (FEC) operating mode capability information; and the FEC operating mode capability information is for use in determining, at least in part, at least one FEC operating mode capability of the Ethernet PHY circuitry.

7. A method implemented using ethernet physical layer transceiver (PHY) circuitry, the Ethernet PHY circuitry being for use in frame communication with a remote link partner, the Ethernet PHY circuitry also to communicate with local medium access controller (MAC) circuitry, the Ethernet PHY circuitry comprising physical coding sublayer (PCS) circuitry, transmitter circuitry, and receiver circuitry, the method comprising:

using the PCS circuitry in communicating with the local MAC circuitry; and using the transmitter circuitry and the receiver circuitry in the frame communication;

wherein:

when the Ethernet PHY circuitry is in operation, the transmitter circuitry, during at least one negotiation with the remote link partner, is to transmit link codeword page information that comprises link operating mode capability information that indicates at least one 800G-R8 operating mode;

the Ethernet PHY circuitry is to determine a capability priority resolution that is configurable, based upon the at least one negotiation, to reflect the at least one 800G-R8 operating mode;

the Ethernet PHY circuitry is to determine link status information that is configurable, based upon the at least one negotiation, to comprise 800G-R8 link status information;

the at least one 800G-R8 operating mode is associated with timer values;

operating mode capabilities of the Ethernet PHY circuitry and the remote link partner are to be set before expiration of at least one time value defined by the timer values; and the Ethernet PHY circuitry is to store negotiation-related information that is configurable, based upon the at least one negotiation, to indicate whether the Ethernet PHY circuitry is to operate in the at least one 800G-R8 operating mode.

8. The method of claim 7, wherein:

the at least one negotiation comprises an auto-negotiation between the Ethernet PHY circuitry and the remote link partner; and the auto-negotiation is to result in the Ethernet PHY circuitry selecting a highest available operating mode that is common to both the Ethernet PHY circuitry and the remote link partner.

9. The method of claim 8, wherein:

the Ethernet PHY circuitry comprises physical medium attachment (PMA) circuitry and physical medium dependent (PMD) circuitry;

the at least one 800G-R8 operating mode comprises an 800GBASE-KR8 operating mode or an 800GBASE-CR8 operating mode to be implemented, at least in part, via the PMD circuitry; and the negotiation-related information is configurable, based upon the at least one negotiation, to indicate whether the PMD circuitry and/or PMA circuitry are to operate in the at least one 800G-R8 operating mode.

10. The method of claim 9, wherein:

the link operating mode capability information that indicates at least one 800G-R8 operating mode comprises technology ability field information indicated via technology ability field bit A19.

11. The method of claim 10, wherein:
the link operating mode capability information that indicates at least one 800G-R8 operating mode is to be transmitted via bit D40 of the link codeword page information.

12. The method of claim 9, wherein:
the link codeword page information also comprises forward error correction (FEC) operating mode capability information; and
the FEC operating mode capability information is for use in determining, at least in part, at least one FEC operating mode capability of the Ethernet PHY circuitry.

13. At least one non-transitory machine-readable storage medium storing instructions that are executable by ethernet physical layer transceiver (PHY) circuitry, the Ethernet PHY circuitry being for use in frame communication with a remote link partner, the Ethernet PHY circuitry also to communicate with local medium access controller (MAC) circuitry, the Ethernet PHY circuitry comprising physical coding sublayer (PCS) circuitry, transmitter circuitry, and receiver circuitry, the instructions, when executed by the Ethernet PHY circuitry resulting in the Ethernet PHY circuitry being configured for performance of operations comprising:
using the PCS circuitry in communicating with the local MAC circuitry; and
using the transmitter circuitry and the receiver circuitry in the frame communication;
wherein:
when the Ethernet PHY circuitry is in operation, the transmitter circuitry, during at least one negotiation with the remote link partner, is to transmit link codeword page information that comprises link operating mode capability information that indicates at least one 800G-R8 operating mode;
the Ethernet PHY circuitry is to determine a capability priority resolution that is configurable, based upon the at least one negotiation, to reflect the at least one 800G-R8 operating mode;
the Ethernet PHY circuitry is to determine link status information that is configurable, based upon the at least one negotiation, to comprise 800G-R8 link status information;
the at least one 800G-R8 operating mode is associated with timer values;
operating mode capabilities of the Ethernet PHY circuitry and the remote link partner are to be set before expiration of at least one time value defined by the timer values; and
the Ethernet PHY circuitry is to store negotiation-related information that is configurable, based upon the at least one negotiation, to indicate whether the Ethernet PHY circuitry is to operate in the at least one 800G-R8 operating mode.

14. The at least one non-transitory machine-readable storage medium of claim 13, wherein:
the at least one negotiation comprises an auto-negotiation between the Ethernet PHY circuitry and the remote link partner; and
the auto-negotiation is to result in the Ethernet PHY circuitry selecting a highest available operating mode that is common to both the Ethernet PHY circuitry and the remote link partner.

15. The at least one non-transitory machine-readable storage medium of claim 14, wherein:
the Ethernet PHY circuitry comprises physical medium attachment (PMA) circuitry and physical medium dependent (PMD) circuitry;
the at least one 800G-R8 operating mode comprises an 800GBASE-KR8 operating mode or an 800GBASE-CR8 operating mode to be implemented, at least in part, via the PMD circuitry; and
the negotiation-related information is configurable, based upon the at least one negotiation, to indicate whether the PMD circuitry and/or PMA circuitry are to operate in the at least one 800G-R8 operating mode.

16. The at least one non-transitory machine-readable storage medium of claim 15, wherein:
the link operating mode capability information that indicates at least one 800G-R8 operating mode comprises technology ability field information indicated via technology ability field bit A19.

17. The at least one non-transitory machine-readable storage medium of claim 16, wherein:
the link operating mode capability information that indicates at least one 800G-R8 operating mode is to be transmitted via bit D40 of the link codeword page information.

18. The at least one non-transitory machine-readable storage medium of claim 15, wherein:
the link codeword page information also comprises forward error correction (FEC) operating mode capability information; and
the FEC operating mode capability information is for use in determining, at least in part, at least one FEC operating mode capability of the Ethernet PHY circuitry.

19. Network interface controller circuitry for use in frame communication with a remote link partner, the network interface controller circuitry also being for use in association with one or more of at least one operating system, at least one driver, and/or at least one application, the network interface controller circuitry comprising:
Ethernet physical layer transceiver (PHY) circuitry to communicate with local medium access controller (MAC) circuitry, the Ethernet PHY circuitry comprising:
physical coding sublayer (PCS) circuitry for use in communicating with the local MAC circuitry; and
transmitter circuitry and receiver circuitry for use in the frame communication;
wherein:
when the Ethernet PHY circuitry is in operation, the Ethernet PHY circuitry is configurable, at least in part, based upon configuration data to be provided via the one or more of the at least one operating system, the at least one driver, and/or the at least one application, to enable or disable one or more of the following:
transmission via the transmitter circuitry, during at least one negotiation with the remote link partner, of link codeword page information that comprises link operating mode capability information that indicates at least one 800G-R8 operating mode;
determination by the Ethernet PHY circuitry of a capability priority resolution that is configurable, based upon the at least one negotiation, to reflect the at least one 800G-R8 operating mode;
determination by the Ethernet PHY circuitry of link status information that is configurable, based upon the at least one negotiation, to comprise 800G-R8 link status information;

setting of operating mode capabilities of the Ethernet PHY circuitry and the remote link partner before expiration of at least one time value defined by timer values associated with the at least one 800G-R8 operating mode; and/or storage by the Ethernet PHY circuitry of negotiation-related information that is configurable, based upon the at least one negotiation, to indicate whether the Ethernet PHY circuitry is to operate in the at least one 800G-R8 operating mode.

20. The network interface controller circuitry of claim 19, wherein:

the at least one negotiation comprises an auto-negotiation between the Ethernet PHY circuitry and the remote link partner;

the auto-negotiation is to result in the Ethernet PHY circuitry selecting a highest available operating mode that is common to both the Ethernet PHY circuitry and the remote link partner;

the Ethernet PHY circuitry comprises physical medium attachment (PMA) circuitry and physical medium dependent (PMD) circuitry;

the at least one 800G-R8 operating mode comprises an 800GBASE-KR8 operating mode or an 800GBASE-CR8 operating mode implementable, at least in part, via the PMD circuitry; and the negotiation-related information is configurable, based upon the at least one negotiation, to indicate whether the PMD circuitry and/or PMA circuitry are to operate in the at least one 800G-R8 operating mode.

21. The network interface controller circuitry of claim 20, wherein:

the link operating mode capability information that indicates at least one 800G-R8 operating mode comprises technology ability field information indicated via technology ability field bit A19;

the link operating mode capability information that indicates at least one 800G-R8 operating mode is for transmission via bit D40 of the link codeword page information;

the link codeword page information also comprises forward error correction (FEC) operating mode capability information; and the FEC operating mode capability information is for use in determining, at least in part, at least one FEC operating mode capability of the Ethernet PHY circuitry.

22. Server system usable in association with at least one data center, the server system being for use in frame communication with a remote link partner, the server system also being for use in association with one or more of at least one operating system, at least one driver, and/or at least one application, the server system comprising:

network interface controller circuitry comprising Ethernet physical layer transceiver (PHY) circuitry to communicate with local medium access controller (MAC) circuitry, the Ethernet PHY circuitry comprising:

physical coding sublayer (PCS) circuitry for use in communicating with the local MAC circuitry; and transmitter circuitry and receiver circuitry for use in the frame communication;

wherein:

when the Ethernet PHY circuitry is in operation, the Ethernet PHY circuitry is configurable, at least in part, based upon configuration data to be provided via the one or more of the at least one operating system, the at least one driver, and/or the at least one application, to enable or disable one or more of the following:

transmission via the transmitter circuitry, during at least one negotiation with the remote link partner, of link codeword page information that comprises link operating mode capability information that indicates at least one 800G-R8 operating mode;

determination by the Ethernet PHY circuitry of a capability priority resolution that is configurable, based upon the at least one negotiation, to reflect the at least one 800G-R8 operating mode;

determination by the Ethernet PHY circuitry of link status information that is configurable, based upon the at least one negotiation, to comprise 800G-R8 link status information;

setting of operating mode capabilities of the Ethernet PHY circuitry and the remote link partner before expiration of at least one time value defined by timer values associated with the at least one 800G-R8 operating mode; and/or storage by the Ethernet PHY circuitry of negotiation-related information that is configurable, based upon the at least one negotiation, to indicate whether the Ethernet PHY circuitry is to operate in the at least one 800G-R8 operating mode.

23. The server system of claim 22, wherein:

the at least one negotiation comprises an auto-negotiation between the Ethernet PHY circuitry and the remote link partner;

the auto-negotiation is to result in the Ethernet PHY circuitry selecting a highest available operating mode that is common to both the Ethernet PHY circuitry and the remote link partner;

the Ethernet PHY circuitry comprises physical medium attachment (PMA) circuitry and physical medium dependent (PMD) circuitry;

the at least one 800G-R8 operating mode comprises an 800GBASE-KR8 operating mode or an 800GBASE-CR8 operating mode implementable, at least in part, via the PMD circuitry; and the negotiation-related information is configurable, based upon the at least one negotiation, to indicate whether the PMD circuitry and/or PMA circuitry are to operate in the at least one 800G-R8 operating mode.

24. The server system of claim 23, wherein:

the link operating mode capability information that indicates at least one 800G-R8 operating mode comprises technology ability field information indicated via technology ability field bit A19;

the link operating mode capability information that indicates at least one 800G-R8 operating mode is for transmission via bit D40 of the link codeword page information;

the link codeword page information also comprises forward error correction (FEC) operating mode capability information; and the FEC operating mode capability information is for use in determining, at least in part, at least one FEC operating mode capability of the Ethernet PHY circuitry.

* * * * *